United States Patent [19]
Wörner

[11] 3,983,982
[45] Oct. 5, 1976

[54] CLUTCH DISK FOR MOTOR VEHICLE MAIN CLUTCHES

[75] Inventor: Günter Wörner, Rommelshausen, Germany

[73] Assignee: Daimler-Benz Aktiengesellschaft, Germany

[22] Filed: Jan. 27, 1975

[21] Appl. No.: 544,264

[30] Foreign Application Priority Data
Jan. 31, 1974 Germany.................. 7403223[U]

[52] U.S. Cl. ........................... 192/106.2; 64/27 C
[51] Int. Cl.[2] ................. F16D 69/00; F16D 3/14
[58] Field of Search ........... 192/30 V, 70.16, 70.18, 192/106.1, 106.2, 70.17; 64/27 C, 27 F

[56] References Cited
UNITED STATES PATENTS

| | | | |
|---|---|---|---|
| 2,623,409 | 12/1952 | Herndon et al. | 74/688 |
| 3,578,121 | 5/1971 | Maurice | 192/106.2 |
| 3,684,070 | 8/1972 | Maucher | 64/27 F X |
| 3,802,541 | 4/1974 | Schneider | 192/70.17 X |
| 3,817,362 | 6/1974 | Rist | 192/106.1 |
| 3,863,747 | 2/1975 | Werner et al. | 192/70.17 X |

*Primary Examiner*—Samuel Scott
*Assistant Examiner*—Lance W. Chandler
*Attorney, Agent, or Firm*—Craig & Antonelli

[57] ABSTRACT

A clutch disk for motor vehicle main clutches in which a disk member carrying the friction linings is rigidly connected with a lateral sheet metal member by means of axially parallel bolts and this system is operatively connected torsionally elastically with a flange member which extends by means of a flange portion between the disk member and the lateral sheet metal member; the flange portion is thereby provided with apertures for the passage of the bolts interconnecting the disk member with the lateral sheet metal member, whereby several springs or spring groups are provided in windows of the disk member and of the lateral sheet metal member to which are coordinated correspondingly larger windows in the hub flange; in addition to an idling damping device, a separate damping device is provided for the operating range whose start of operation is controlled by a sheet metal control member which is being centered directly on the hub member and which includes two mutually oppositely disposed arms; the first arm of the sheet metal control member encloses by means of a window a prestressed control spring arranged in the hub flange while the second arm cooperates with a bolt between the disk member and the lateral sheet metal member for purposes of controlling the start of operation.

30 Claims, 3 Drawing Figures

U.S. Patent  Oct. 5, 1976  3,983,982
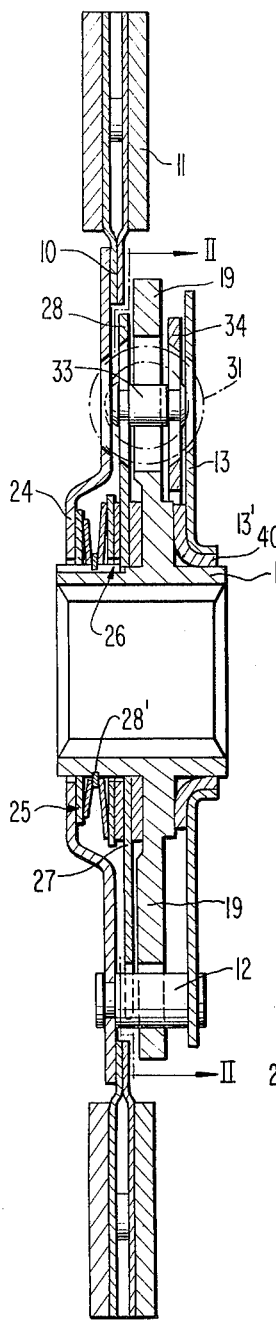
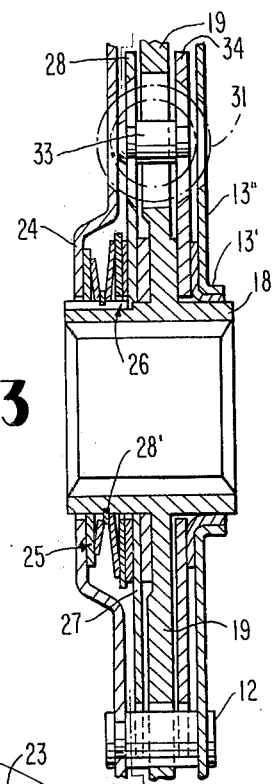
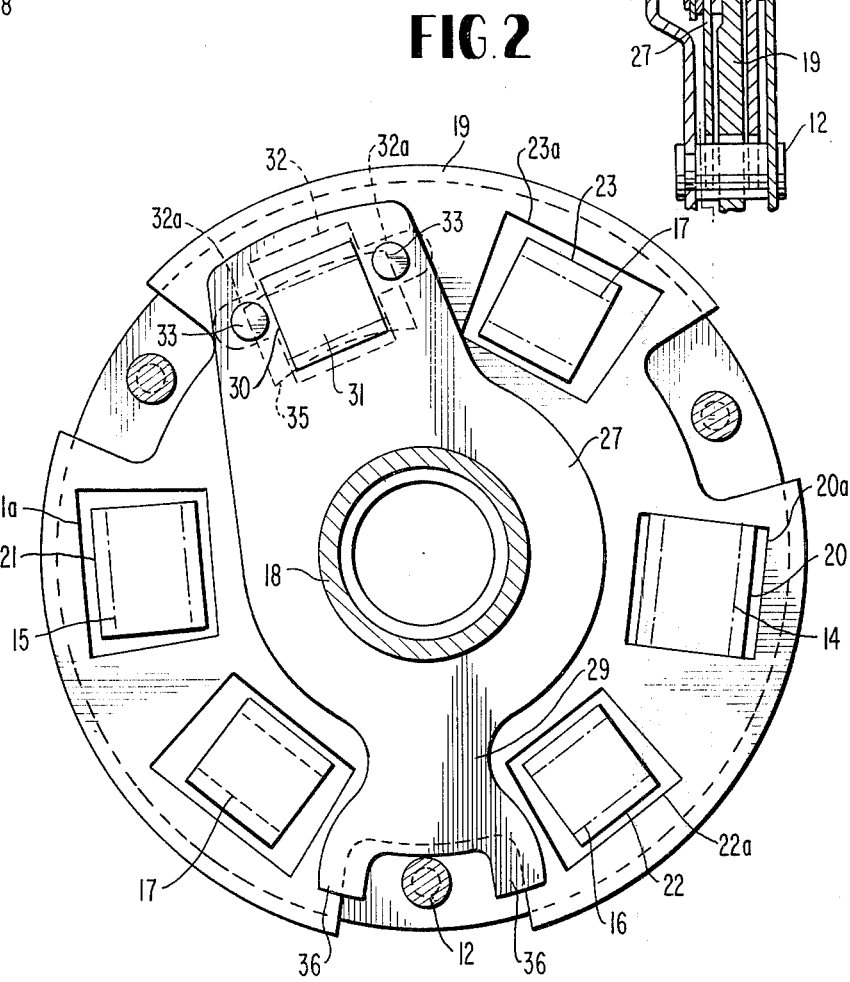
FIG. 1
FIG. 3
FIG. 2

CLUTCH DISK FOR MOTOR VEHICLE MAIN CLUTCHES

The present invention relates to a clutch disk for motor vehicle main clutches whereby a disk member carrying the friction linings is rigidly connected with a lateral sheet metal member by axially parallel bolts and this system is operatively connected torsionally elastically with a hub member which engages with a flange portion between the disk member and the lateral sheet metal member, and which is provided with apertures for the passage of the bolts, whereby several springs or spring groups are provided in windows of the disk member and of the lateral sheet metal member, to which are coordinated correspondingly larger windows in the hub flange, and whereby furthermore in addition to the idling damping device, additionally a separate damping device is provided for the operating range, whose start of operation is controlled by a sheet metal control member.

With such clutch disks, there always exists the desire for a construction which is simple as regards manufacture and also for an exact centering of the aforementioned parts in order that the load and stresses, especially in the sheet metal control system, can be reduced thereby. With the clutch disks of the aforementioned type, as are known in the art, or as already have been proposed heretofore, frequently the individual parts of individual systems are very complicated and are centered at one another indirectly one above the other. Apart from the fact that the accuracy of the centering thereby suffers frequently, considerable loads and stresses of the individual parts occur already alone by reason of the mostly unsymmetrical centering.

The underlying problems are solved in accordance with the present invention with the clutch disks of the aforementioned type in that the sheet metal control member is centered directly on the hub flange and is equipped with two approximately mutually oppositely disposed arms, whose first arm encloses with a window a prestressed control spring arranged in the hub flange and whose second arm cooperates with a bolt between the disk member and the lateral sheet metal member for the purpose of controlling its start of operation. Normally, the windows for the control spring in the hub flange and in the sheet metal control member are thereby of equal size. If, in contradistinction thereto, the operation is to take place with a so-called advanced damping, the window in the sheet metal control member may also be constructed larger, that is, may therefore be constructed longer in the circumferential direction than the control spring window in the hub flange.

The clutch disk according to the present invention, at the outset, produces a very considerable simplification in the manufacture. The sheet metal control member is constructed, for exmple, as a simple, punched-out part and the hitherto frequently customary balconylike embossments or axially cranked or bent-over tabs can be dispensed with. Furthermore, a very exact centering of the sheet-metal control member will result so that the control member cannot tilt and also cannot displace itself in the radial direction. A considerably smaller load and stress in the sheet metal control system will result therefrom. The prestressed control spring thereby assures a constant return of the sheetmetal control system into the starting position.

It is additionally proposed by the present invention that the first arm of the sheet-metal control member is rigidly connected by axially parallel pins with a counter sheet-metal member disposed on the other side of the hub flange. The counter sheet-metal member may thereby be constructed frame-like and may be provided with an identical window for the control spring as the first arm itself. This means, in other words, the counter sheet-metal member does not possess the same central annular portion as the sheet metal control member but it is provided exclusively within the area of the first arm as a rectangular extension so to speak of. The advantage of this arrangement resides in a central or concentric force engagement in relation to the control spring. In that connection, it is then additionally proposed by the present invention that the window in the hub flange accommodating the control spring be provided with two extensions in the circumferential direction for the passage therethrough of the pins.

A further proposal according to the present invention goes to the effect that the second arm is constructed fork-shaped at the end thereof and surrounds with its fork ends the bolt between the disk member and the lateral sheet metal member with a spacing corresponding to the control starting point. In this manner, this bolt receives a double function, so to speak of, which has as a consequence a further simplification. The otherwise customary axially bent control tabs at the sheet metal control member can be dispensed with thereby.

A further feature of the present invention resides in the fact that the sheet metal control member and the sheet metal counter member are disposed on the two sides of the hub flange between the latter and the disk member and the lateral sheet metal member, respectively. According to the present invention, the lateral sheet metal member may be flanged over sleeve-shaped at the inner circumference and may be centered at this location on the hub member by means of an interposed slide ring. The disk member, in its turn, may be provided with a pot-shaped indentation or recess at the inner part thereof, in which the idling damping device is then accommodated. It is thereby particularly appropriate if both damping devices are acted upon by cup springs which are supported on a common abutment, for example, on a snap ring, arranged between the same in the hub member.

Accordingly, it is an object of the present invention to provide a clutch disk for motor vehicle main clutches which avoids by simple means the aforementioned shortcomings and drawbacks encountered in the prior art.

Another object of the present invention resides in a clutch disk for motor vehicle main clutches which entails considerable advantages as regards ease of manufacture and simplicity of the parts.

A further object of the present invention resides in a clutch disk for motor vehicle main clutches which excels by an exact centering of its various parts, thereby reducing the loads acting thereon.

Still a further object of the present invention resides in a clutch disk for motor vehicle main clutches of the type described above in which the various parts are relatively uncomplicated and involve a greatly facilitated manufacture.

Still another object of the present invention resides in a clutch disk for motor vehicle main clutches in which indentations, embossments and/or tabs, necessary in the prior art systems, can be dispensed with.

A further object of the present invention resides in a clutch disk for motor vehicle main clutches which is characterized by an improved operation, particularly as regards the loads and stresses in the various parts thereof.

These and other objects, features, and advantages of the present invention will become more apparent from the following description when taken in connection with the accompanying drawing which shows, for purposes of illustration only, two embodiments in accordance with the present invention, and wherein:

FIG. 1 is a longitudinal axial cross-sectional view through a clutch disk in accordance with a first embodiment of the present invention;

FIG. 2 is an elevational view on the clutch disk, corresponding to the line II—II of FIG. 1; and FIG. 3 is a longitudinal axial cross-section view through a clutch disk in accordance with a second embodiment of the present invention.

Referring now to the drawing wherein like reference numerals are used throughout the two views to designate like parts, according to FIGS. 1 and 2, the disk member 10 of the clutch disk—which carries the friction linings 11—is rigidly connected in a conventional manner by means of bolts 12 with a lateral sheet metal member 13. This entire system is torsionally elastically connected with the hub member 18 by several stage springs 14 – 17 (FIG. 2), whereby the flange 19 of the hub member 18 engages between the lateral sheet-metal member 13 and the disk member 10. The stage springs 14 to 17 are arranged in windows 20 to 23 in the disk member 10 and in the lateral sheet metal member 13. They come into operation sequentially in a conventional, known manner whereby corresponding windows 20a to 23a are coordinated thereto in the hub flange 19. The windows 21a to 23a are in a known manner larger in the circumferential direction than the corresponding windows 21 to 23 so that the start of operation of the stage springs takes place sequentially.

The idling damping device generally designated by reference numeral 25 is accommodated in a pot-shaped indentation 24 (FIG. 1) at the inner circumference of the disk member 10. A further damping device generally designated by reference numeral 26 is provided for the operating range which cooperates with a sheet-metal control member 27. The cup springs of the two damping devices 25 and 26 are arranged symmetrically mirror-image-like to one another. They are supported on a spring or snap-ring 28' as common abutment which is disposed between the same. The start of operation of the operating damping device 26 is determined by the sheet-metal control member 27 (FIG. 2). The latter includes a first arm 28 and a second arm 29 (FIG. 2) which are disposed essentially mutually opposite one another. The first arm 28 encloses without play or clearance a control spring 31 by means of a window 30, which control spring is retained in a similarly large window 32 of the hub flange 19 under corresponding prestress. A counter sheet-metal member 34 (FIG. 1) is rigidly connected with the first arm 28 by pins 33 (FIGS. 1 and 2) whereby the counter sheet-metal member 34 is disposed on the other side of the hub flange 19. The window 32 in the hub flange 19 is provided with extensions 32a extending in the circumferential direction for the passage therethrough of the pins 33. The counter sheet metal member 34, of course, possesses an identical window so that the force engagement at the control spring 31 takes place substantially concentrically. Windows 35 (FIG. 2) are provided in the disk member 10 and in the lateral sheet metal member 13 for the control spring 31 which are enlarged in the circumferential direction with respect to the windows 32 corresponding to the desired starting point of operation.

The second arm 29 terminates fork-shaped at the end. The two fork prongs 36 (FIG. 2) enclose the bolt 12. A corresponding play is provided thereat which corresponds also to the desired starting point of operation for the second damping device 26.

The lateral sheet metal member 13 (FIG. 1) is flanged over sleeve-shaped at the inner circumference as indicated by reference numeral 13' and is centered thereat on the hub member 18 by means of an interposed slide ring 40 of any suitable material.

During the rotation of the disk member 10 with respect to the hub member 18 at first the idling damping device 25 and the idling spring 14 are operative. The other stage springs become operative sequentially corresponding to the amount of rotation or twist traversed by the parts, as known in the art. When the play or clearance between the bolt 12 and the fork ends 36 at the second arm 29 of the sheet metal control member 27 has been used up, then the sheet-metal control member 27 is taken along by the disk member 10 against the effect of the control spring 31. The second friction device 26 then becomes operative. During the return movement, the operation takes place in the reverse sequence.

As shown in FIG. 3, the possibility also exists to construct within the frame of the present invention, a counter sheet-metal member 13 congruent with the sheet-metal control member 27 and to center the same on the hub 18 in a similar manner. The mutual fastening of the two sheet metal members 13 and 27 takes place analogous to the system disk member-lateral sheet metal member by axially parallel bolts 12 which extend through the hub flange 10. Appropriately, the bolts 12 of the two systems lie within the same radial planes. The sheet metal control system receives an increased rigidity by this construction.

While I have shown and described only two embodiments in accordance with the present invention, it is understood that the same is not limited thereto but is susceptible of numerous changes and modifications as known to those skilled in the art, and I therefore do not wish to be limited to the details shown and described herein but intend to cover all such changes and modifications as are encompassed by the scope of the appended claims.

I claim:

1. A clutch disk for motor vehicle main clutches which includes a disk member carrying friction linings and rigidly connected with a lateral sheet metal member by way of axially substantially parallel bolts, the system consisting of said disk member and lateral sheet metal member being torsionally elastically connected with a hub member, which engages by means of a flange portion between the disk member and the lateral sheet metal member and which is provided with apertures for the passage therethrough of said bolts, several spring means provided in window means of the disk member and of the lateral sheet metal member, to which are coordinated correspondingly larger window means in the hub flange, idling damping means, and an additional separate damping means for the operating range whose starting point of operation is controlled by a control means, characterized in that the control means is centered directly on the hub member and includes two arms disposed approximately opposite one another, the first arm enclosing by means of a further window means a prestressed control spring means arranged in the hub flange and the second arm of said control means cooperating with a bolt means between the disk member and the lateral sheet metal member for purposes of controlling the start of operation.

2. A clutch disk according to claim 1, characterized in that the control means is a sheet metal control member.

3. A clutch disk according to claim 1, characterized in that several spring groups are provided by said spring means.

4. A clutch disk according to claim 1, characterized in that the first arm of the control means is rigidly connected by way of axially substantially parallel pins with a counter member disposed on the other side of the hub flange.

5. A clutch disk according to claim 4, characterized in that the counter member is a sheet metal counter member.

6. A clutch disk according to claim 4, characterized in that the counter member is constructed frame-like and is provided with a similar window means for the control spring means as the first arm.

7. A clutch disk according to claim 6, characterized in that the window means in the hub flange receiving the control spring means is provided with two extensions in the circumferential direction for the passage therethrough of the pins.

8. A clutch disk according to claim 7, characterized in that the second arm is constructed fork-shaped at the end and encloses with its fork ends one of said bolts with a spacing corresponding to the control starting point.

9. A clutch disk according to claim 8, characterized in that the control means and the counter member are disposed on the two sides of the hub flange, respectively between the hub flange and the disk member and between the hub flange and the lateral sheet metal member.

10. A clutch disk according to claim 9, characterized in that the lateral sheet metal member is flanged-over sleeve-shaped at the inner circumference and is centered thereat on the hub member by means of an interposed slide ring.

11. A clutch disk according to claim 10, characterized in that the disk member is provided at its inner portion with a pot-shaped indentation and the idling damping means is accommodated in said indentation.

12. A clutch disk according to claim 11, characterized in that both damping means are actuated by cup springs which are supported on a common abutment means arranged between the same in the hub member.

13. A clutch disk according to claim 12, characterized in that said abutment means is a snap ring.

14. A clutch disk according to claim 12, characterized in that the counter member is constructed substantially congruent with respect to the control means and is also centered at the hub member.

15. A clutch disk according to claim 14, characterized in that the control means is a sheet metal control member.

16. A clutch disk according to claim 15, characterized in that the counter member is a sheet metal counter member.

17. A clutch disk according to claim 4, characterized in that the window means in the hub flange receiving the control spring means is provided with two extensions in the circumferential direction for the passage therethrough of the pins.

18. A clutch disk according to claim 1, characterized in that the second arm is constructed fork-shaped at the end and encloses with its fork ends one of said bolts with a spacing corresponging to the control starting point.

19. A clutch disk according to claim 4, characterized in that the control means and the counter member are disposed on the two sides of the hub flange, respectively between the hub flange and the disk member and between the hub flange and the lateral sheet metal member.

20. A clutch disk according to claim 1, characterized in that the lateral sheet metal member is flanged-over sleeve-shaped at the inner circumference and is centered thereat on the hub member by means of an interposed slide ring.

21. A clutch disk according to claim 1, characterized in that the disk member is provided at its inner portion with a pot-shaped indentation and the idling damping means is accommodated in said indentation.

22. A clutch disk according to claim 1, characterized in that both damping means are actuated by cup springs which are supported on a common abutment means arranged between the same in the hub member.

23. A clutch disk according to claim 22, characterized in that said abutment means is a snap ring.

24. A clutch disk according to claim 22, characterized in that the disk member is provided at its inner portion with a pot-shaped indentation and the idling damping means is accommodated in said indentation.

25. A clutch disk according to claim 4, characterized in that the counter member is constructed substantially congruent with respect to the control means and is also centered at the hub member.

26. A clutch disk according to claim 1, characterized in that said further window means incloses the prestress control spring means without play or clearance.

27. A clutch disk according to claim 26, characterized in that said two arms are approximately diametrically opposite one another.

28. A clutch disk according to claim 27, characterized in that the second arm is constructed fork-shaped at the end and encloses with its fork ends one of said bolts with a spacing corresponding to the control starting point.

29. A clutch disk according to claim 28, characterized in that the control means and the counter member are disposed on the two sides of the hub flange, respectively between the hub flange and the disk member and between the hub flange and the lateral sheet metal member.

30. A clutch disk according to claim 1, characterized in that said two arms are approximately diametrically opposite one another.

* * * * *